(12) United States Patent
Himmelreich et al.

(10) Patent No.: US 9,619,773 B2
(45) Date of Patent: Apr. 11, 2017

(54) SYSTEMS AND METHODS FOR CODE INSTRUMENTATION FOR ANALYTICS

(71) Applicants: Evgeny Himmelreich, Modiin (IL); Vladimir Tkach, Kfar Yona (IL); Alexey Soshin, Ramat Gan (IL); Alex Kravchik, Petah Tikwa (IL)

(72) Inventors: Evgeny Himmelreich, Modiin (IL); Vladimir Tkach, Kfar Yona (IL); Alexey Soshin, Ramat Gan (IL); Alex Kravchik, Petah Tikwa (IL)

(73) Assignee: SAP Portals Israel Ltd., Ra'Anana (IL)

( * ) Notice: Subject to any disclaimer, the term of this patent is extended or adjusted under 35 U.S.C. 154(b) by 271 days.

(21) Appl. No.: 14/486,295

(22) Filed: Sep. 15, 2014

(65) Prior Publication Data

US 2016/0078388 A1 Mar. 17, 2016

(51) Int. Cl.
*G06Q 10/06* (2012.01)
*G06Q 30/02* (2012.01)
*H04L 12/14* (2006.01)
*G06F 11/34* (2006.01)
*H04L 29/08* (2006.01)
*H04L 12/26* (2006.01)
*H04L 12/24* (2006.01)
*H04L 29/06* (2006.01)

(52) U.S. Cl.
CPC ....... *G06Q 10/06375* (2013.01); *G06F 11/34* (2013.01); *G06F 11/3495* (2013.01); *G06Q 10/063* (2013.01); *G06Q 30/0202* (2013.01); *H04L 12/1407* (2013.01); *G06F 11/3409* (2013.01); *G06F 11/3438* (2013.01); *G06F 11/3476* (2013.01); *G06F 2201/865* (2013.01); *H04L 41/147* (2013.01); *H04L 43/0817* (2013.01); *H04L 67/22* (2013.01); *H04L 69/22* (2013.01)

(58) Field of Classification Search
CPC ......... G06F 9/4443; G06F 9/485; H04L 29/06
USPC .......................... 709/203, 220, 224; 345/473
See application file for complete search history.

(56) References Cited

U.S. PATENT DOCUMENTS

| | | | |
|---|---|---|---|
| 5,764,241 A * | 6/1998 | Elliott | G06F 17/30017 345/473 |
| 8,929,859 B2 * | 1/2015 | McNamee | H04L 12/1407 455/405 |
| 9,092,247 B2 * | 7/2015 | y Arcas | G06F 9/455 |
| 9,544,751 B2 * | 1/2017 | McNamee | H04L 12/1407 |

(Continued)

*Primary Examiner* — Khanh Dinh
(74) *Attorney, Agent, or Firm* — Buckley, Maschoff & Talwalkar LLC

(57) ABSTRACT

A system and method of inserting instrumentation analytics into a business application program that is written in a web browser language is disclosed. The method includes receiving at an instrumentation server the business application program, parsing the business application program to generate an abstract syntax tree, examining the abstract syntax tree to identify function calls within the business application program, and inserting an instrumentation framework into the business application program to create a modified business application program, the instrumentation framework monitoring function calls during operation of the modified business application program. A system to implement the method and a computer-readable medium are disclosed.

14 Claims, 2 Drawing Sheets

(56) References Cited

U.S. PATENT DOCUMENTS

| | | | | |
|---|---|---|---|---|
| 2009/0193497 A1* | 7/2009 | Kikuchi | ............... | G06F 21/54 726/1 |
| 2013/0263127 A1* | 10/2013 | y Arcas | ............... | G06F 9/455 718/1 |
| 2014/0201838 A1* | 7/2014 | Varsanyi | ............ | H04L 63/1425 726/23 |
| 2015/0079929 A1* | 3/2015 | McNamee | .......... | H04L 12/1407 455/406 |

* cited by examiner

SYSTEMS AND METHODS FOR CODE INSTRUMENTATION FOR ANALYTICS

BACKGROUND

Analysis of website usage by end users provides important information to the enterprise operating the website. The collected data can inform the enterprise on consumer trends, product interests, and other marketing related insight into the enterprise's business. Also, this information can be used to forecast user access to the website so that the computing platform can be sized to handle this future demand.

Conventionally there are two main techniques of collecting data on website usage: web server logfiles and page tagging. The web server can record file requests received from users' browsers, and these logfiles can be analyzed. Page tagging is implemented by embedding a script into the code that renders the website on the users' browser. This script records requests for the website. Data collected by either technique is analyzed to generate web traffic reports showing usage of the website. The accuracy of these web traffic reports can be suspect, and the error margin of the reports can be hard to quantify with any confidence.

The analytics provided by web usage can be used by enterprises to gage the effectiveness of marketing campaigns, user/consumer satisfaction, web traffic and site popularity. Additionally, web metrics can track a user's actions on the website itself by analyzing the users' clicks when visiting the webpage. Click analytics can be done in real-time, or stored for later analysis.

DETAILED DESCRIPTION

Systems and methods in accordance with embodiments, provides instrumentation analytics which wraps a website-based business application after its code is programmed, as opposed to conventional web analytics scripts that execute when the application is requested for access by a user visiting the website. This instrumentation can provide metrics on functions and/or full namespaces by reporting back to the web server with statistics on function usage. Coupled with proactive elasticity in resource allocation, the reported metrics can be used by a webserver to allocate additional computing resources to the website prior to client (e.g., end user) demand increases.

Embodying systems and methods monitor whether a website is up and running; if the website is performing as expected; and common usage patterns of applications accessed via the website. The embodying systems and methods use code generating tools to analyze usage of different business flows that are triggered by the end user interaction on the client side. Based on this analysis, embodying systems and methods optimizes resizing of the website platform based on the usage forecast according to historical patterns.

In accordance with some implementations, an instrumentation framework file is provided to place callbacks at different points of the HTML and/or script codes of the business application program. These points can be defined by the software developer and/or integrator of the business application. The instrumentation framework callbacks can gather runtime information from the business application that is used for web analytics. For websites that implement OpenSocial specification-compliant hosting environments, the instrumentation framework file can be provided with feature(s) to instrument the OpenSocial gadgets themselves.

When user interfaces are modeled during website development, the embodying instrumentation framework can add anchors, metadata and/or other business flow/transaction runs on the server side to be read by analytic applications.

Figure 1:
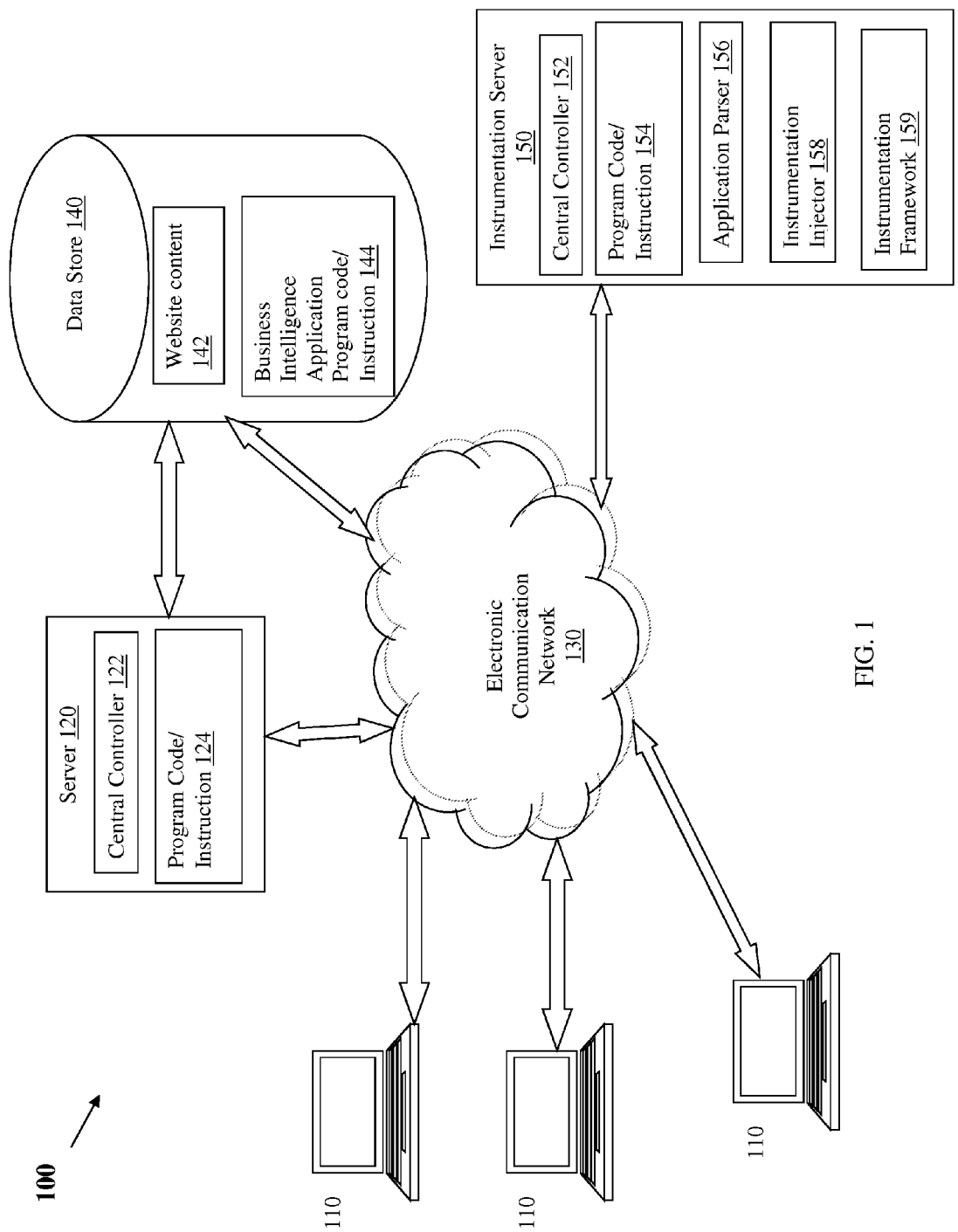
FIG. 1 depicts a system in accordance with some embodiments.

FIG. 1 depicts system 100 for instrumenting business applications with analytics in accordance with some embodiments. System 100 includes one or more client computers 110 in communication with server 120 across electronic communication network 130. Server 120 can include central controller 122, which is a processor that executes program code/instructions 124 to control the server in performing its functions. Server 120 can host one or more websites by accessing website content 142 stored in data store 140. Server 120 delivers web page content to the remote client computers in response to receiving a web browser request for that content from the client computer.

Server 120 can also provide business intelligence application(s) 144 to the client computers. These business intelligence application(s) can be pushed and/or pulled to the client computer to provide business intelligence tools to a user of the client computer.

System 100 can include instrumentation server 150. In accordance with some embodiments, the instrumentation server can be located within web server 120. Instrumentation server 150 includes central controller 152 which executes program instruction 154. The central controller, in response to executing program instructions, controls other components of the instrumentation server.

Application parser 156 accesses one or more business applications 144. This access can be requested by a developer of the business application. By accessing the business application, the application parser can parse the business application program code/instruction to identify function calls (radio button activation, web page load, business process flows, etc.). Application parser 156 can generate an abstract syntax tree (AST) that defines nodes and properties of function calls within the business application. In accordance with some implementations, the application parser can include a tokenizer that produces an AST token object. The function calls within the business application code/instruction are identified from the AST.

Instrumentation injector 158 can insert instrumentation framework 159 into the parsed business application. In accordance with embodiments the instrumentation framework can be of different templates to be compatible with the particular web browser language (e.g., Java, wordpress, ODP, etc.) implemented by the client computer that accesses the business application. The instrumentation framework assigns a monitoring script to each function call identified in the business application program instruction. The monitoring script can create log files that are then available to track the website performance when the function is called by a user.

By way of example, suppose that a simple business application had the following code:

```
Function yourFunc ( ) {
    // Your code
}
```

Application parser 156 can parse the code as simple text. Instrumentation injector 158 can then instrument the business application by inserting an instrumentation framework. After instrumentation the business application may look like this:

```
Function yourFunc( ) {
    logStart('yourFunc');
    // Your code
    logEnd('yourFunc');
}
```

In response to a user action (e.g., activating a radio button), assume that yourFunc( ) is called. The instrumentation logStart creates the following entry in a function call log:

"START", "yourFunc", 01/01/01 11:12:38
"END", "yourFunc", 01/01/01 11:13:39

Based on these log entries, the function took 61 seconds for this start/end cycle. The function call log can be further analyzed to determine, for example, (1) how many times was this function called? (count 'yourFunc' appearances in the log, and divide by two); or (2) whether the performance of this function is consistent? (e.g., check the average, maximum, and/or minimum function execution time for each start/end cycle recorded in the log). Other metrics can be obtained by using the data stored in the function call log.

In accordance with embodiments, instrumentation framework 159 provides executable program instruction analytics for each function call in the business application. Each time a function call is made during the operation of the business application the executable program instruction analytic enters data into a log file. In this manner the instrumentation framework binds HTTP calls to the business process context to provide analytical data for evaluation.

Specific portions of the business process, or the entire process, can be evaluated to identify any problem areas by implementing the instrumentation framework. Conventional web analytics are called only once, so the only statistic available is whether a page was called or not. Embodying instrumentation analytics can generate a log entry for every function, providing better resolution into the operation of the business application. In accordance with embodiments, the instrumentation analytics wraps a website-based business application after its code is programmed. This instrumentation can provide metrics on functions and/or full namespaces by reporting back to the web server with statistics on function usage.

Figure 2:
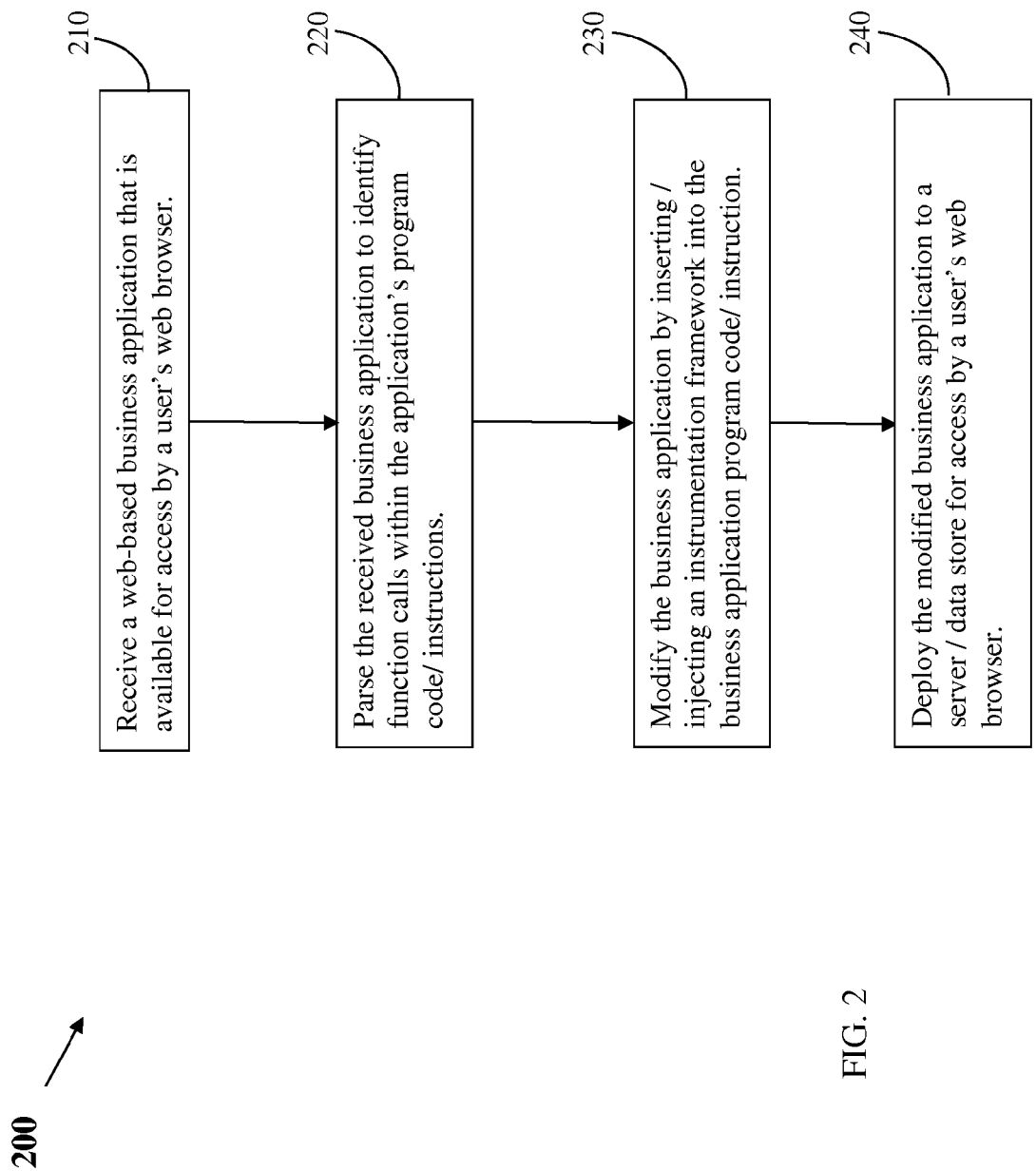
FIG. 2 depicts a process in accordance with some embodiments.

FIG. 2 depicts process 200 for installing an instrumentation framework into a business application in accordance with some embodiments. An instrumentation server receives, step 210, a business application. The business application can be a web-based application that is available for access by a user's web browser running on a client computer. The business application can be stored in a data store accessible by the instrumentation server across an electronic communication network. The business application can be written, for example, in JavaScript code which is presently the dominant coding language. However, embodying instrumentation analytics can be developed for other languages. Because the business application is written in a code that is interpreted, and does not need to be compiled, the business application can be changed to include the instrumentation framework with minimal disruption to the business application operation as designed by its developer.

The business application received at the instrumentation server is parsed, step 220, by the application parser. The application parser examines the business application's program code/instruction to generate an AST. The AST is then examined to identify function calls (radio button activation, web page load, business process flows, etc.) within the business application.

Insert/inject an instrumentation framework, step 230, into the business application. The instrumentation framework can be scripts inserted into the business application using predetermined code/instruction that monitors the function calls identified in the parsing step. Once the instrumentation framework is inserted/injected into the business application, this modified business application is deployed, step 240, to a server and/or data store for access by a user's web browser.

In accordance with embodiments, a system usage forecast can be optimized by analyzing historical usage patterns. This approach provides elasticity to the website by predicting the demand and adding additional resources before all the available resources are consumed. By adding additional resources based on the predicted usage, the website performance does not degrade with increasing demand.

In one implementation, an analytic instrumentation framework file can be located on an application developer's system or on a remote server. This instrumentation framework file can be inserted into an application file. The instrumentation framework file can be an executable file or application. For purposes of discussion this instrumentation framework file can have the name js_instrumentation.

By way of example, consider a simple, single file business enterprise application that displays a radio button with the label "Press Me" on a client GUI. The HTML code for this application can be as follows:

```
<html>
<head>
<script>
Function buttonPress( )
{
    Alert ("Button was pressed");
}
</script>
</head>
<body>
<h1>Application</h1>
<input type = 'button' value = 'Press Me' onClick =
'javascript:buttonPress( )' />
</body>
</html>
```

In one example if a developer wants to track the time it takes for the application page to load, a call can be made to the instrumentation framework file located in the directory C:/ as follows:

C:\js_instrumentation.exe C:\Server load-time

Where C:\ Server is the location of files that the developer would like to instrument; and load-time is a parameter specifying that the instrumentation should add callbacks at the start and end of the application code. After instrumentation, the simple application listed above can have the following HTML code:

```
<html>
<head>
<script>
Function buttonPress( )
{
    Alert ("Button was pressed");
}
</script>
<script src = "Analytics.js"></script>
</head>
<body>
<script>var startTime = new Date( );</script>
<h1>Application</h1>
<input type = 'button' value = 'Press Me' onClick =
'javascript:buttonPress( )' />
<script>
Var endTIme = new Date( );
Analytics.sendData(endTime-startTime);
</script>
</body>
</html>
```

This edited code can create a reference object that can be used for communication with a data gathering service. In particular, the added lines (italicized above) store when the page started to load from the server and when the load was completed at the client side. The last line of added code (Analytics.sendData(endTime-startTime) sends the start and load completion times to the data gathering service.

In accordance with embodiments, developers are provided with an option to know how much time it takes to load the application without having to write their own code. Additionally, the Analytics object can also send other data (e.g., user IP address, location, browser, etc.) to the data gathering service.

In accordance with some embodiments, data can be gathered regarding other user interaction with an application. By way of example, a developer could want to track the number of times that a button in the application is actually pressed by a user. An instrumentation script can include logging each function call made during the execution of an application. A simple application with instrumentation to log function calls can have the following HTML code:

```
<html>
<head>
<script>
Function buttonPress( )
{
    Analytics.sendData("Button was pressed");
    Alert ("Button was pressed");
}
</script>
</head>
<body>
<h1>Application</h1>
<input type = 'button' value = 'Press Me' onClick =
'javascript:buttonPress( )' />
</body>
</html>
```

Where C\:js_instrumentation.exe C:\Server function-calls is executed to insert the call to Analytics object in the application; where the parameter "function-calls" directs instrumentation to add the logs for every function call during the application's execution. In accordance with the above implementation, each time a button is pressed function buttonPress( ) is called and the Analytics object logs the call. This approach is useful for a developer or product manager to understand how useful a section of application code and/or functionality is to a user.

In accordance with embodiments, this solution provides tracking metrics on what was viewed on a page, and how the user interacted with the page. In addition to the metrics described above embodying instrumentations can also be applied to images and banners to track load times and view duration by the user.

In accordance with some embodiments, instrumentation can be included in applications to provide business flow analytics. This instrumentation can be added to an application so that UI elements can be tagged with corresponding business meanings. The instrumentation would not affect how the UI elements are displayed or function, but can track actions and business flows from the UI element.

By way of example, suppose an application displays a first page on a user's monitor, and then on a user's action displays a second page. The instrumentation can create a metadata record in a database with the log depicted in Table I:

TABLE I

| Step Name | Step Time |
|---|---|
| Start-load | 10:20:36 |
| End-load | 10:20:38 |
| Next-step | 10:21:20 |

Changes in the application can be tracked to determine the time it takes a user to complete a business flow action that is part of the application (e.g., filling in requested payment information into a web form; or other data entry requests). If changes are made to the application, a determination can be made by examining the metadata record on whether the business flow operation became more complex (e.g., the time to Next-step increased). Determination can be made as to whether the load time increased by examining if the time duration between Start-load and End-load increased. The metadata record can also be used to determine if the user abandoned the operation altogether (i.e., no time stamp data for Next-step).

The embodying instrumentation and inserted scripts do not affect the business application's functionality. The instrumentation (and its associated analytical software, if present) record data into the metadata record. As described above, this metadata record is examined to make determinations regarding the operation of the business application. If a user does not wait for page load to complete before going to the next step, the log would track this interaction by the user—(i.e., End-load would have no data). Such user interaction can alert the developer or product manager to a problem in the business process flow that users are dissatisfied with. This problem can then be addressed by altering the business flow, or by blocking the functionality of the next-page-button on the UI until the page completely loads.

In accordance with embodiments, instrumentation and inserted scripts can be used to track aggregation of historical data. Historical data can include, but is not limited to, CPU usage, memory usage, traffic (inbound and/or outbound). In a multi-tenant relational database management system, the historical data can be stored in a tenant specific manner, and/or by tenant application, and/or any level of granularity including for specific web elements of hosted sites.

In an exemplary implementation, historical information can be used to predicate resource demand/consumption. Such a predication can be used for better sizing resource allocation at predicated times. For example, if an online shop promotes a sale on the last Friday of every year or its operation, historical data can be used as a prediction for CPU resource allocation on the upcoming sale day. Allocation of CPUs can be very expensive and place stress demands on a system to provide CPU during a prolonged period. Statistical historical data can be used to reduce the number of server CPUs that are allocated at any time during that Friday sale to match the business volume of prior years during the day. A pattern of usage by hour, or other time unit, can be discerned from the historical data. CPU allocation can then be scheduled to match the pattern of usage.

In another implementation, historical data gleaned from activities of existing enterprises or activities can be used to predict resource allocation for totally new applications. For example, a new internet store can use historical data from other operations as a basis to predict what resource allocation the new store might need. The system could use anonymous statistics from other applications to predict, for example, that there'll be less activity during the summer and a two hundred percent increase of users in December.

In another implementation, historical data can be used to determine advantageous location and/or relocation of datacenter operations. The location of physical servers is important for providing acceptable user experiences. Even though the datacenter is accessed over an electronic communication network (e.g., Internet, VPN, etc.), the placement of the actual datacenter can be susceptible to communication delay due to the infrastructure of local systems. Even without infrastructure impact, a user situated in India and accessing a physical site located in the United States is likely to experience a response delay greater than if the site was located in India.

In accordance with embodiments, data collected by embodying instrumentation can be analyzed to predict the beneficial placement of the datacenter based on usage statistics. For instance, a cloud hosted site dedicated to a global enterprise's event can take place on three separate occasions from three distinct locations across the globe (e.g., Spain in March, India in April, and USA in May). Conventionally, this site is hosted on the same server, in the same datacenter for each occasion. Assuming that the datacenter is located in USA, it is likely that participants in the U.S.A. event would have the best user experience in accessing the site. Users in Spain and India could have less of an experience due to response delays from accessing the remote situated sited. However, overall experience can be improved by relocating the site to a datacenter that has historical usage statistics indicating an improved experience with users in Spain for the March event; and relocated to another site with an improved experience for users in India for the April event.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods discussed herein such as a method for inserting instrumentation code into a business application so that metrics can be obtained on the business application flow, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A method of inserting instrumentation analytics into a business application program that is written in a web browser language, the method comprising:
  receiving at an instrumentation server the business application program;
  parsing the business application program to generate an abstract syntax tree (AST);
  examining the abstract syntax tree to identify function calls within the business application program;
  inserting an instrumentation framework into the business application program to create a modified business application program;
  the instrumentation framework assigning a respective monitoring script to each identified function call of the modified business application program;
  tracking performance of user initiated function calls during operation of the modified business application program;
  each respective monitoring script creating log files of the user initiated function calls made during operation of the modified business application program; and
  tracking user interaction with the modified business application program by evaluating usage patterns present in the log file.

2. The method of claim 1, including deploying the modified business application program for access by a user.

3. The method of claim 1, including analyzing historical usage patterns present in the log file to forecast future system usage load demands.

4. The method of claim 1, including determining an elapsed time for a user to complete a business flow action.

5. The method of claim 1, wherein the parsing step includes producing an AST token object.

6. A non-transitory computer-readable medium having stored thereon instructions which when executed by a processor cause the processor to perform a method of inserting instrumentation analytics into a business application program that is written in a web browser language, the method comprising:
  receiving at an instrumentation server the business application program;
  parsing the business application program to generate an abstract syntax tree (AST);
  examining the abstract syntax tree to identify function calls within the business application program;
  inserting an instrumentation framework into the business application program to create a modified business application program;
  the instrumentation framework assigning a respective monitoring script to each identified function call of the modified business application program;
  deploying the modified business application program for access by a user;

tracking performance of user initiated function calls during operation of the modified business application program;

each respective monitoring script creating log files of the user initiated function calls made during operation of the modified business application program; and tracking user interaction with the modified business application program by evaluating usage patterns present in the log file.

7. The non-transitory computer-readable medium of claim 6, including instructions to cause the processor to perform the step of analyzing historical usage patterns present in the log file to forecast future system usage load demands.

8. The non-transitory computer-readable medium of claim 6, including instructions to cause the processor to perform the step of determining an elapsed time for a user to complete a business flow action.

9. The non-transitory computer-readable medium of claim 6, including instructions to cause the processor to perform the parsing step by producing an AST token object.

10. A system for inserting instrumentation analytics into a business application program that is written in a web browser language, the system including:

an instrumentation server structured to receive a business application program across an electronic communication network;

the instrumentation server including an application parser structured to parse the received business application program to identify function calls;

the instrumentation server including an instrumentation injector structured to inject an instrumentation framework into the received business application program;

the instrumentation server including a central controller structured to execute computer-readable instructions that cause the central controller to perform a method including:

receiving at an instrumentation server the business application program;

parsing the business application program to generate an abstract syntax tree (AST);

examining the abstract syntax tree to identify function calls within the business application program;

inserting an instrumentation framework into the business application program to create a modified business application program;

the instrumentation framework assigning a respective monitoring script to each identified function call of the modified business application program;

tracking performance of user initiated function calls during user operation of the modified business application program;

each respective monitoring script creating log files of the user initiated function calls made during operation of the modified business application program; and tracking user interaction with the modified business application program by evaluating usage patterns present in the log file.

11. The system of claim 10, including instructions to cause the central controller to deploy the modified business application program for access by a user.

12. The system of claim 10, including instructions to cause the central controller to analyze historical usage patterns present in the log file to forecast future system usage load demands.

13. The system of claim 10, including instructions to cause the central controller to, determine an elapsed time for a user to complete a business flow action.

14. The system of claim 10, including instructions to cause the central controller to perform the parsing step by producing an AST token object.

* * * * *